United States Patent [19]

Bailleux et al.

[11] Patent Number: 4,493,917

[45] Date of Patent: Jan. 15, 1985

[54] BLEND OF POLYMERS, ITS PREPARATION AND ITS APPLICATION TO THE MANUFACTURE OF COMPONENTS OF ELECTROCHEMICAL REACTORS

[75] Inventors: Christian Bailleux, Paris; Michel Bernard, Pont-Ste-Maxence; Bernard Dupont, Creil; Guy Lozach, Chantilly; Jean-Pierre Mata, Paris, all of France

[73] Assignee: Electricite de France, Paris, France

[21] Appl. No.: 548,532

[22] Filed: Nov. 3, 1983

[30] Foreign Application Priority Data

Nov. 3, 1982 [FR] France ............................. 82 18408

[51] Int. Cl.$^3$ ..................... C08L 27/12; C08L 27/18; C08L 81/04; C08L 81/06
[52] U.S. Cl. .................................. 524/394; 523/222; 525/150; 525/189; 525/535; 525/536; 525/537
[58] Field of Search .............. 525/150, 535, 537, 189, 525/536; 524/394; 523/222

[56] References Cited

U.S. PATENT DOCUMENTS

| | | | |
|---|---|---|---|
| Re. 31,448 | 11/1983 | Attwood et al. | 525/150 |
| T988,008 | 11/1979 | Mayer et al. | 525/537 |
| 3,992,347 | 11/1976 | Vary | 525/150 |
| 3,993,843 | 11/1976 | Vasta | 525/150 |
| 4,090,993 | 5/1978 | Attwood et al. | 525/150 |
| 4,131,711 | 12/1978 | Attwood | 525/150 |
| 4,169,117 | 9/1979 | Vasta | 525/150 |

*Primary Examiner*—Allan M. Lieberman
*Attorney, Agent, or Firm*—Pollock, VandeSande & Priddy

[57] ABSTRACT

The present invention relates to a plastic blend of polymers, capable of being injected and extruded, the process for producing it and its applications.

This blend is produced by extrusion of a matrix of heat-stable material consisting of a polysulfone resin or polyphenylene sulfide and of a filler of a fluorocarbon polymer resin, the extrusion producing a network of interconnected and inter-penetrated fibers of filler within the matrix.

This blend can be employed in an aggressive environment and at a high temperature, particularly for the manufacture of components of electrochemical reactors such as electrolysis cells.

14 Claims, No Drawings

BLEND OF POLYMERS, ITS PREPARATION AND ITS APPLICATION TO THE MANUFACTURE OF COMPONENTS OF ELECTROCHEMICAL REACTORS

BACKGROUND OF THE INVENTION

The present invention relates to a new blend of polymers, its preparation and its application to the manufacture of components of electrochemical reactors. The invention relates in particular to the application of this blend of polymers to the manufacture of frames for alkaline electrolysis cells operating at a high temperature, in particular those intended to ensure the alkaline electrolysis of water.

The present invention permits the production of frames for the filter press stack of an electrolyzer intended, for example, to provide an alkaline electrolysis and more particularly the alkaline electrolysis of water at a high temperature.

The frames form the supporting structure of the electrolyzer and contain the electrolyte. They must ensure sealing leaktight to the liquid and to the gases evolved at an overpressure relative to the surrounding environment. They ensure the geometric location of the cell components, such as the electrodes and the diaphragm. In particular, they determine the spacing between these components.

In addition, the frames permit the circulation of fluids towards the interior and towards the exterior of the cells by means of accurately calibrated orifices. They thus ensure the distribution of the fluid at the entry and the collection of the emulsions at the exit.

Finally, the frames must ensure the electric insulation of the adjacent electrodes.

The whole combination of these functional characteristics must be maintained during the entire lifetime of the installation, in the aggressive environment formed by the concentrated, hot electrolyte (for example: 80,000 hours in 40% potassium hydroxide, at a temperature of the order of 120° C., under an internal oxygen and hydrogen pressure of 30 to 60 bars).

In the present state of the technique, there is no industrial plant to be found which makes it possible to reach high temperatures of the order of 120° C. in concentrated potassium hydroxide. Various solutions have, however, already been suggested for the production of such frames. They usually make use of fluorinated polymers whose many disadvantages rule out these solutions. In fact, fluorinated polymers having a high creep. Their industrial mass production by injection is found to be impracticable in the present state of the art, even for smaller dimensions than those which are under consideration. Their coefficient of expansion is an order of magnitude higher than that of the electrodes to be supported, which presents mechanical problems. The change in the geometry due to post-injection relaxation produces deformations which are incompatible with the function of a fluid injector.

The solution which is proposed within the scope of the present invention is based on the development of a blend of polymers. It involves blending, in the form of an adequate structure, a chemically non-reactive and hydrophobic fluorinated polymer with a matrix of a heat-stable polymer. The heat-stable polymer confers its mechanical properties to the compound, whilst the hydrophobic fluorinated polymer forms an anticorrosion barrier by stopping the penetration by the aggressive solution. The structure of the dispersion of fluorinated polymer in the matrix must be organized so that it behaves towards the aggressive agent as would a continuous phase of the same material, so as to form a surface screen, regardless of the orientation of the surface remaining facing the reactive environment.

BRIEF SUMMARY OF THE INVENTION

The blend of polymers according to the invention is a blend produced by extrusion and/or injection at a temperature between approximately 250° C. and approximately 320° C., of a matrix of heat-stable material consisting of a polysulfone resin or polyphenylene sulfide and of a filler of fluorocarbon polymer resin, the extrusion and/or the injection producing a network of interconnected and inter-penetrated fibers of filler within the matrix.

According to the present invention, the process for producing such a blend of polymer, for example with a view to manufacturing components of electrochemical reactors, is one in which the blend of polymers is produced by extrusion and/or injection at a temperature of between approximately 250° and approximately 320° C. of a polyphenylene sulfide resin and a filler of fluorocarbon polymer resin.

The blends of polymers according to the present invention withstand in a satisfactory manner attack by the alkaline electrolyte while exhibiting very favorable thermomechanical properties. These properties are the modulus in instantaneous tension and in instantaneous compression, and the creep resistance. Furthermore, components of electrochemical reactors, such as frames, can be mass-produced industrially at a low cost by a process of injection of such a blend of polymers under pressure.

In addition, the components such as the frames according to the present invention require no additional machining, which is a decisive advantage for the cost of production. The accuracy of reproduction is excellent and enables the components produced to be relied on for functions requiring a narrow manufacturing tolerance, without affecting the cost. The shrinkage on cooling is much lower than that of fluorinated materials.

It should, finally, be noted that the geometry of the components such as the frames according to the invention is accurately determined and is insensitive to the rise in temperature. The coefficient of expansion of such components is comparable to that of the electrodes, which simplifies the design of the electrolyzer or of the battery. Finally, the material thus produced is much less fragile than the base materials, which makes it possible to dispense with special precautions in the assembly of the various parts of electrolysis cells and of electrochemical reactors in general.

Other characteristics of the present invention will appear from reading of the following detailed description.

GENERAL DESCRIPTION OF THE INVENTION

The matrix of the blends of polymers according to the invention consists of a polysulfone resin (PSU) or polyphenylene sulfide (PPS). As an example of PSU resins, the resin marketed by the Union Carbide Company under the trade name "UDEL 1700" will be mentioned, which produces quite satisfactory results, if restricted to service temperature ranges in the region of 120° C. In practise, it has been found that the use of a polyphenylene sulfide resin makes it possible to reach service ranges above 150° C. As a particular example of such PPS resins, the resin marketed by the Phillips Company under the trade name "RYTON P4" may be mentioned.

According to the present invention, the blend of polymers is obtained by extrusion and/or injection of such a matrix and of a filler of a fluorocarbon polymer resin. Such a filler may be chosen from the polytetrafluoroethylene resins, such as the resin marketed by the PCUK Company under the trade name "SOREFLON 71", or from dispersions of fusible fluorinated copolymers, such as polyfluoroethylene, perfluorinated ethylene-propylene copolymer or perfluoroalkoxy resin.

The extrusion, carried out at a temperature substantially between approximately 250° C. and approximately 320° C., produces, owing to the shearing forces which are generated, a network of interconnected and intimately inter-penetrated fibers of filler within the matrix. A blend is thus obtained both phases of which are morphologically continuous. A series of samples of blends with concentrations ranging from approximately 5% up to approximately 40% by weight has been produced with the same net structure, having a network which tightens progressively as the concentration is increased. The film which is produced on the surface forms a protective screen against the attack by potassium hydroxide. In practise it has been found that it is not essential that this film forms a strictly continuous surface, provided that the mesh of the lattice is sufficiently dense for the hydrophobic film to appear to be virtually impenetrable on the scale of capillary phenomena.

The corrosion tests carried out over a thousand hours confirm the theoretical approach. The mechanical properties of the matrix are not impaired in any way by the incorporation of the filler. On the contrary, although PPS is a fragile and brittle material, it has been found that the incorporation of the fluorocarbon filler stabilizes the material, as demonstrated by the flexural stress. Moreover, an appreciable improvement is found, unexpectedly, in the mechanical properties of the blends of PPS in traction, relative to the unblended control. At moderate filler concentrations, the tensile modulus is clearly strengthened. The most spectacular improvement relates to the properties at break, under stress and in elongation. This improvement can be at least partly attributed to the superior control of the fabrication of the blend relative to the unblended material.

The technique used by the process according to the invention consists of an extrusion of the mixture, followed by injection. It is therefore possible to mass-produce items of a complex shape comprising profiles, channels, components for the circulation of fluid, joints, locating studs, and the like, at a low cost which is that of the injection of conventional thermoplastics.

DETAILED DESCRIPTION OF PREFERRED EMBODIMENT

A particular embodiment of the invention will be given below as a non-limiting example.

(1) Mixing of the following components using a rapid mixer (such as the PAPENMEIER):
polyphenylene sulfide PPS powder (Ryton P4)
polytetrafluoroethylene powder such as (SOREFLON 71) zinc stearate powder, for example (STAVINOR ZNE of the Rousselot Company).

The addition of an internal lubricant, such as zinc stearate, to the mixture facilitates screw engagement during the extrusion of the granulate without affecting the characteristics of the items produced.

The mixture may comprise from approximately 5 to approximately 40% by weight of fluorocarbon filler.

The mixtures containing approximately 20 to approximately 40% have led to better results.

This operation can last for the order of 10 minutes.

The mixture is then dried in a ventilated oven at 120° C. before extrusion.

(2) Extrusion

The mixture is extruded in an extruder.

While the operation conditions can depend on the material employed, it will be possible, when a screw extruder is employed, to refer, for example, to the following non-limiting conditions which relate to a Samafor 45 extruder with a two-stage screw 45 mm in diameter and 28 D in length:
zone 1 = 300° C.
zone 2 = 300° C.
zone 3 = 300° C.
zone 4 = 300° C.
die: 300° C.
speed of rotation from 30 to 40 rpm for a throughput from 10 to 15 kg/h. The rod obtained passes into a granulator.

In practise, it is found advantageous to carry out the extrusion between approximately 250° C. and approximately 320° C. for PPS and between approximately 250° C. and approximately 300° C. for PSU.

(3) Injection

The operating conditions depend on the material employed. As an example, a description is given of one of the processes which operates satisfactorily in an "ARBURG ALLROUNDER" molding machine with a screw 20 in diameter and 30 cm in width, two heater elements and a temperature-controlled nozzle:
zone 1 = 320° C.
zone 2 = 305° C.
nozzle = 245° C.
Mole temperature = 90° C.
Pressure = 1350 bars
Injection cycle = (total time 55 s)
Closing = 1 s
Injection and hold: 7 s
Dosing (setting 4.8; 300 rpm) = 10 s
Cooling = 46 s
Opening = 1 s.

It is clear that the injection temperatures can be subject to some variations. Thus, wholly satisfactory results are obtained, for example, with injection temperatures having the following approximate values:

|     | heating element | nozzle | mold | hydraulic pressure |
| --- | --- | --- | --- | --- |
| PPS | 250–320° C. | 250–280° C. | approx. 135° C. | 90 bars |
| PS | 340–410° C. | approx. 290° C. | approx. 90° C. | 90 bars |

Naturally, the present invention is not limited in any way to the particular examples referred to above, but is is perfectly possible, without thereby departing from the scope of the invention, to envisage a number of alternative forms of its embodiment. The invention applies, in particular, to the production of all types of injection-molded articles starting from the blend of polymers described.

What is claimed is:

1. A blend of polymers, which is produced by extrusion and/or injection at a temperature between approximately 250° C. and approximately 320° C., of a particulate mixture of a heat-stable material consisting of a polysulfone resin or polyphenylene sulfide and a chemically inert and hydrophobic fluorocarbon polymer resin as a filler, the concentration of said fluorocarbon in said mixture being in a range to produce a network of interconnected and interpenetrated fibers of said fluorocarbon within a matrix of said heat-stable material upon said extrusion and/or injection.

2. The blend of polymers as claimed in claim 1, wherein the fluorocarbon polymer resin consists of polytetrafluoroethylene.

3. The blend of polymers as claimed in claim 1, wherein the filler of fluorocarbon polymer resin consists of a dispersion of perfluorinated ethylene-propylene copolymer or perfluoroalkoxy resin.

4. The blend of polymers as claimed in one of claims 1 to 3, wherein the fluorocarbon polymer resin is present in a concentration of approximately 5 to approximately 40% by weight.

5. The blend of polymers as claimed in one of claims 1 to 4, which additionally contains an internal lubricant.

6. A process for preparing a blend of polymers comprising a matrix of a heat-stable polysulfone resin or polyphenylene sulfide and a filler of an hydrophobic fluorocarbon polymer resin as claimed in claim 1, wherein a particulate mixture of said matrix resin and said filler resin is extruded and/or injected at a temperature between approximately 250° C. and approximately 320° C., the concentration of filler being in a range so that the extrusion and/or the injection produces a network of interconnected and interpenetrated fibers of filler within the matrix.

7. The process as claimed in claim 6, wherein the heat-stable resin is a polyphenylene sulfide resin.

8. The process as claimed in claim 6, wherein the heat-stable resin is a polysulfone resin.

9. A component for an electrochemical reactor comprising a blend of polymers as claimed in one of claims 1 to 5.

10. A component as claimed in claim 9, wherein said blend comprises a mixture of polyphenylene sulfide and a fluorocarbon polymer resin and said component is formed by injecting said mixture into a mold at a temperature between approximately 250° and approximately 320° C.

11. A component as claimed in claim 9, wherein said blend comprises a mixture of a polysulfone resin and a fluorocarbon polymer resin and said component is formed by injecting said mixture into a mold at a temperature between approximately 250° and approximately 300° C.

12. A component as claimed in one of claims 9 to 11 comprising full or hollow sections.

13. The blend of polymers as claimed in any one of claims 1 to 3 wherein the fluorocarbon resin is present in a concentration of about 20% to about 40% by weight.

14. The blend of polymers as claimed in claim 5 wherein said internal lubricant is zinc stearate.

* * * * *